United States Patent

[11] 3,578,017

[72] Inventor Harry B. Rath
 Allentown, Pa.
[21] Appl. No. 779,194
[22] Filed Nov. 26, 1968
[45] Patented May 11, 1971
[73] Assignee Mack Trucks, Inc.
 Allentown, Pa.

[54] AUTOMATIC ACTUATION OF AIR CLEANER SELECTOR VALVE
 10 Claims, 5 Drawing Figs.

[52] U.S. Cl. .................................................. 137/344,
 123/122, 123/198
[51] Int. Cl. .................................................. F16k 31/46,
 F16k 31/52
[50] Field of Search .................................. 137/344,
 351, 353, 354; 123/122 (H), 122 (D), 198 (D)

[56] References Cited
 UNITED STATES PATENTS

| | | | |
|---|---|---|---|
| 1,212,745 | 1/1917 | Crockett | 137/351X |
| 1,333,776 | 3/1920 | Picotte | 137/354X |
| 1,540,144 | 6/1925 | Redmond | 123/122H |
| 1,628,506 | 5/1927 | Lyman | 137/353X |
| 1,934,953 | 11/1933 | Suiter | 137/354 |
| 2,082,397 | 6/1937 | Hiscock | 123/122H |
| 2,084,991 | 6/1937 | Callahan, Jr. | 123/122H |
| 2,197,503 | 4/1940 | Martin | 123/122D |
| 2,369,937 | 2/1945 | Baster | 123/122H |
| 3,112,741 | 12/1963 | Guarnaschelli | 123/122H |
| 3,394,687 | 7/1968 | Scott | 123/122D |

FOREIGN PATENTS

| | | |
|---|---|---|
| 766,303 | 1/1957 | Great Britain |

*Primary Examiner*—Samuel Scott
*Attorney*—Brumbaugh, Graves, Donohue & Raymond

ABSTRACT: A preferred embodiment of this invention comprises a cam rotatably carried by the drive shaft of a motor that operates the windshield wipers of a vehicle. The cam carries one end of a cable, which is connected to an extension of an air cleaner selector valve that is normally held in a position allowing the passage of air from outside by a spring connected thereto. As the shaft oscillates, the cam is rotated and tensions the cable to move the selector valve to a position allowing the passage of air from under the hood. In order to hold the valve in this latter position, a lever operated by the motor engages a shoulder on the cam and holds it in place until the motor is turned off.

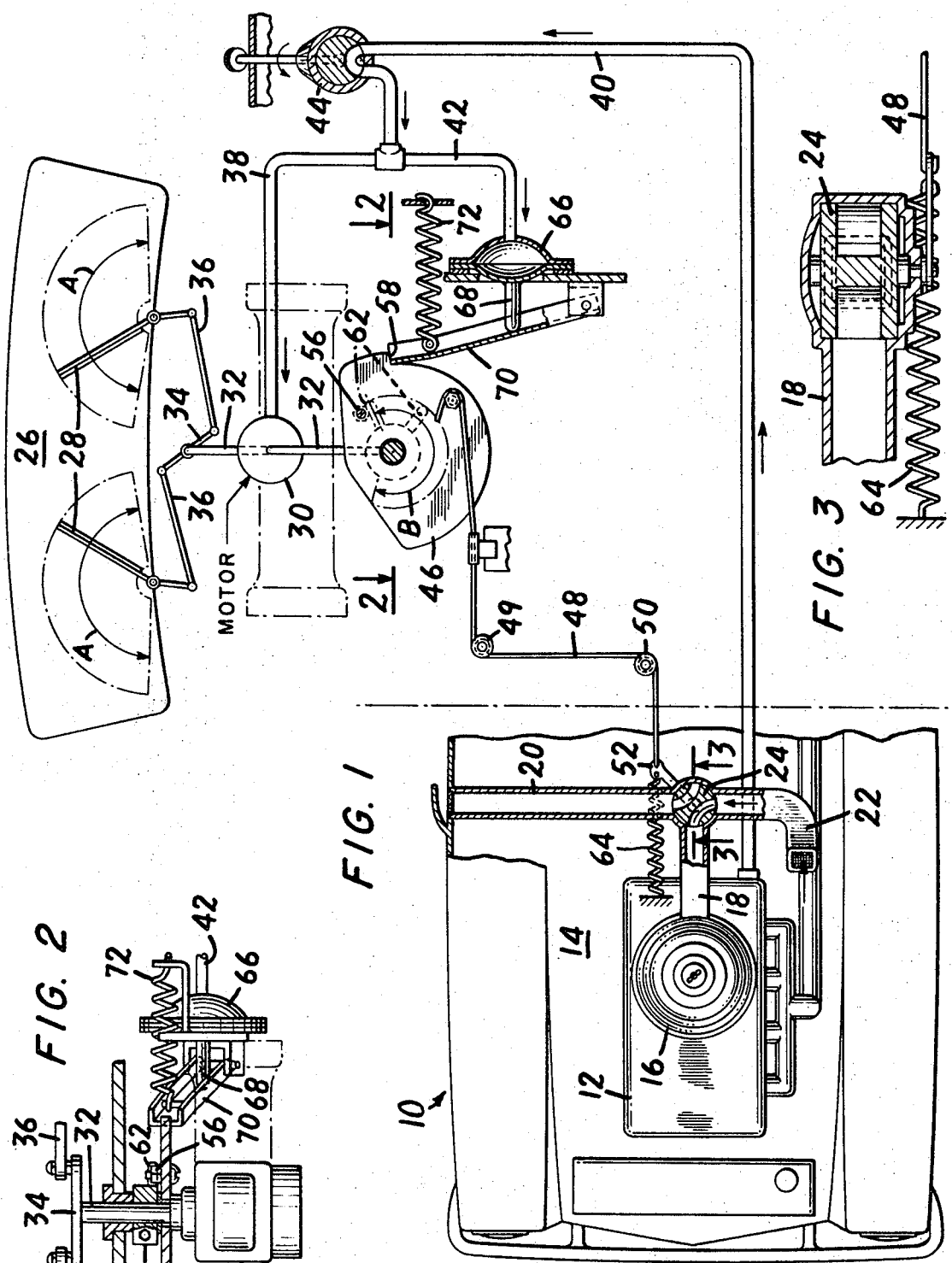

INVENTOR.
HARRY B. RATH
BY
Brumbaugh, Graves, Donohue & Raymond
his ATTORNEYS

AUTOMATIC ACTUATION OF AIR CLEANER SELECTOR VALVE

Under normal weather conditions, it is desirable, when operating motor vehicles, to provide an air intake to the carburetor of a motor vehicle from outside the engine compartment. Such an arrangement has the advantage of providing cool outside air, which is more dense than the heated air inside the engine compartment and provides for a more efficient operation of the engine. When it is raining or snowing, this type of arrangement admits moisture in the air to the air intake conduit. If the air cleaner is mounted outside the engine compartment, as is the case with most trucks, this moisture will accumulate thereon and if the temperature is below freezing, can freeze and block the air cleaner passages, thereby impairing the overall efficiency of the engine.

Prior to this invention, it was a common practice to provide a manually operable selector valve in the inlet to the air cleaner so that, depending upon weather conditions, air could be admitted from either the outside or inside of the engine compartment.

These prior art devices are sometimes not utilized by the vehicle operators, who have a tendency to forget they exist. Thus, if it starts to rain or snow, the vehicle operator will turn on his windshield wipers, but oft times will forget to actuate the selector valve thereby allowing the precipitation to be carried into the air cleaner or carburetor. When the precipitation stops, the driver will turn off his windshield wipers, but if he had actuated the selector valve when the precipitation started, he might forget to deactuate it, thereby allowing hot air from the engine compartment to flow to the carburetor.

Since the vehicle operator's vision is impaired due to the rain or snow, he never forgets to turn on his windshield wipers and this invention utilizes this visual stimulus to assure that the air cleaner selector valve is in the proper operating position by connecting it to the windshield wipers for actuation thereby.

Briefly described, this invention comprises a cam member carried by the windshield wiper motor drive shaft and attached to one end of a cable, the other end of which is connected to the air cleaner selector valve. A shoulder portion on the periphery of the cam member is engaged by a lever member, actuated by the motor, to lock the cam in a selected position where it exerts a tension on the cable thereby holding the selector valve in a position that admits air from the engine compartment. The selector valve is normally urged to a position that admits air from the exterior of the vehicle by a biasing means that becomes operative upon the stopping of the windshield wiper motor.

An exemplary embodiment of this invention is disclosed in the following specification taken with the accompanying drawing in which:

FIG. 1 is a plan view of the engine compartment of an automotive vehicle incorporating an exemplary embodiment of this invention and wherein the control valve actuating mechanism and the windshield wiper operating mechanism are shown schematically for the sake of clarity;

FIG. 2 is a cross-sectional view of a portion of the actuating means shown in FIG. 1 taken along the line 2-2 and looking generally in the direction of the arrows;

FIG. 3 is a cross-sectional view of the control valve taken along the line 3-3 of FIG. 1 and looking generally in the direction of the arrows;

Figure 4:
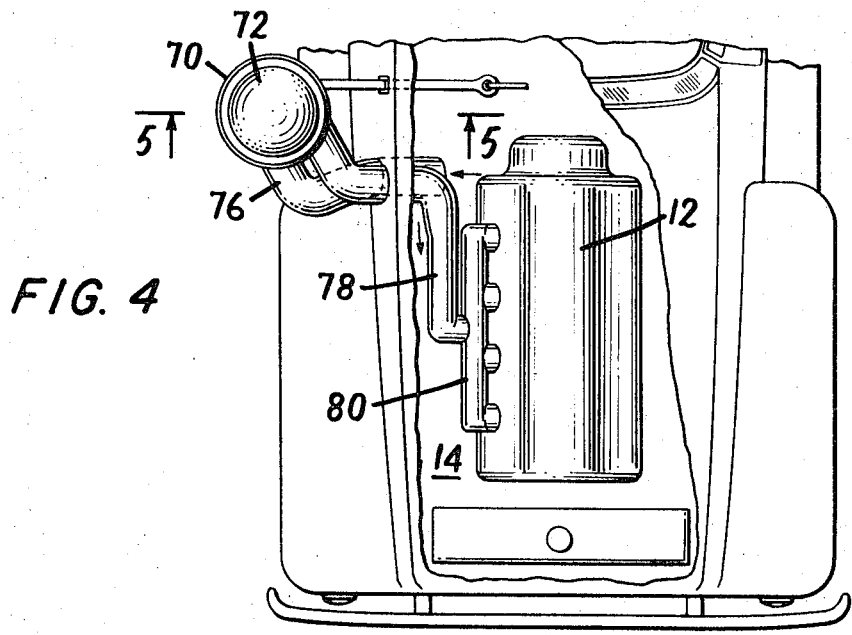
FIG. 4 is a plan view of an engine compartment wherein the air cleaner and selector valve are mounted on the outside thereof; and, FIG. 5 is a cross-sectional view of the air cleaner taken along the line 5-5 of FIG. 4 and looking generally in the direction of the arrows.

Referring now to FIG. 1, there is shown a plan view of the front portion of a vehicle 10, including engine 12 mounted in an engine compartment 14. An air cleaner 16 is mounted on top of the engine 12 and communicates, through an intake duct 18, with an outside air intake duct 20 and an engine compartment or inside air intake duct 22. Rotatably mounted at the intersection of all three intake ducts is a suitable selector valve 24 that controls the flow of air from either the inside or outside intake duct through the air cleaner intake duct 18 and into the air cleaner 16. The valve 24 may be of any suitable three-way type; that is, one that exhausts air from one of two intakes.

The vehicle 10 also includes a windshield 26 and wipers 28, that are driven by a suitable motor 30. In this particular embodiment, a pneumatic motor is utilized, but it is to be understood that an electric or vacuum motor could also be used. Extending rearwardly from the top of the motor 30 is a rotary oscillating drive shaft 32 that is suitably keyed to a yoke 34 for driving a set of links 36 connected thereto. At their ends, the links are pivotally connected to the wipers 28 and drive them back and forth through an arc indicated by the arrows A.

Connected to the engine 12 is a conduit 40 that communicates with a second conduit 38 for directing air from the engine to the motor 30. In order to control the flow of air, a valve 44 of any suitable type is mounted so as to be actuated from the dashboard of the vehicle, as is the usual custom in the art. A third conduit 42 also communicates with the conduit 40 for a purpose which will be fully explained hereinafter.

In order to actuate the selector valve, a cam member 46 is loosely carried on the shaft 32 so as to be rotatably movable thereon. Referring to FIG. 2 for an accurate picture of the shaft and cam arrangement, the cam 46 is carried on the shaft 32 between the motor 30 and yoke 34. Secured to the cam 46, there is a cable 48 which passes over a series of idler pulleys 49 and 50 to an extension 52 of the selector valve 24. The cam 46 also includes a rearwardly projecting stud 56 and a shoulder portion 58 on the periphery thereof, the purposes of which will be fully explained hereinafter.

Keyed to the shaft 32 is a bushing 60 that includes a radially projecting finger 62 that oscillates through the arc B on FIG. 1, upon actuation of the motor 30. In order to impart rotary motion to the cam 46, the finger 62 extends a sufficient distance in a radial direction to engage the stud 56 as it oscillates. A spring 64, also secured to the extension 52 of the selector valve 24, normally biases the selector valve to a position where air is taken from the outside of the vehicle in which position the stud 56 is 90° out of phase from the position shown in FIG. 1; that is, it would project rearwardly from a point directly below the drive shaft 32.

When the motor 30 is actuated, the drive shaft 32 oscillates along a rotary path causing the finger 62 to follow. The finger 62 is normally at a position to the left of the normal position of the stud 56 so that as it rotates it engages the stud and drives the cam to the position shown in FIG. 1, thereby pulling the cable 48 and the extension 52 against the spring 64 to a position where air is admitted to the air cleaner 16 from under the hood.

A suitable locking means is required to hold the cam and the selector valve in the position shown in FIG. 1. One such locking means is described herein for the purpose of illustration only and comprises an air diaphragm unit 66 that communicates with the conduit 42 and includes a plunger 68, the outer end of which bears on a lever 70. The lever 70 is normally held in a retracted position by the spring 72 so that it will not interfere with movement of the cam 46. Upon actuation of the motor 30, air will pass through conduit 42 to the diaphragm 66 and cause the plunger 68 to extend outwardly, thereby forcing the lever 70 to the position shown in FIG. 1 where it can engage the shoulder 58 and hold the cam in position. If an electric motor is used, then the diaphragm will be replaced by a suitable solenoid which will act in a manner similar thereto.

From the preceding description, the operation of this device should be understood, but for purposes of clarity will be described hereinafter. In a normal operating position, the selector valve will be held by the spring 64 in a position allowing air intake air from the outside. When it starts to rain or snow and it is necessary for the driver to turn on the windshield wipers, the valve 44 is actuated, thereby allowing the passage of air from the engine block 12 through the conduit 40 and then through the conduits 38 and 42 where it passes to the motor and the diaphragm, respectively. At this point the drive shaft oscillates in a rotary path thereby driving the windshield wipers 28 and rotating the finger 62 into engagement with the stud 56 thus turning the cam 46 to the position shown in FIG. 1. This causes the cable 48 to pull the selector valve 24 against the spring 64 to the position shown in FIG. 1 where air is admitted from under the hood. At the same time, the air flowing into the diaphragm assembly 66 extends the plunger 68 and pivots the lever 70 to a position where it engages the shoulder 58 and maintains the cam in the operative position shown in FIG. 1. This insures that under adverse weather conditions, the air under the hood is utilized and moisture will not be admitted to either the carburetor or the air filter.

When the weather conditions change and it is no longer raining or snowing, the driver turns the valve 44 to an inoperative position. After a period of several seconds, the pressure in the air line drops to zero and the spring 72 retracts the lever 70 leaving the cam 46 free to rotate on the drive shaft 32. The spring 64 then turns the selector valve extension 52 counterclockwise to a position where air is admitted from the outside of the vehicle. As the selector valve turns, the cable 48 pulls the cam in a clockwise direction to a position where the stud 56 is directly beneath the drive shaft 32, ready for reuse upon actuation of the windshield wipers.

Figure 5:
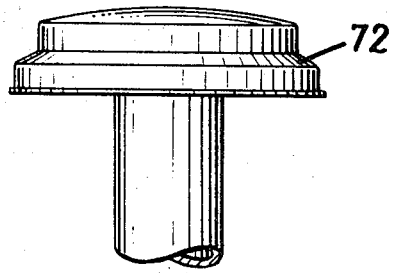

Referring now to FIGS. 4 and 5, there is shown an air cleaner mounted on the outside of the truck rather than on the top of the engine block. The actuating mechanism is exactly the same as that previously described and will therefore not be described herein. Like reference numerals are used to designate like parts in both embodiments.

The vehicle 10 includes an engine compartment 14 wherein the engine 12 is mounted. Secured to the outside of the vehicle 10 is a cleaner assembly including a cylindrical housing 70 with a central opening in its top face for the passage of an outside air intake conduit 74 which carries an air intake means 72 at its upper end. An inside air intake conduit 76 extends from a position in the engine compartment 14 through the sidewall of the housing 70 to the outside conduit 74. The housing 70 communicates with another conduit 78 extending into the engine compartment 14 where it communicates with an intake manifold 80.

Around the lowermost portion 75 of the conduit 74 and concentric therewith, is a filter 82 for cleaning the air before it passes to the manifold 80. Air may be admitted from either of the two conduits 74 or 76 through the lower portion 75 of the conduit 74 and into the air cleaner housing 70, then passing through the filter 82 and through the conduit 78 to the engine 12.

A suitable valve structure is mounted at the intersection of the outside air intake 74 and the inside air intake 76 and comprises a valve plate 84 carried by a pivot pin 85. As the pin rotates, it carries the valve plate to a position where it blocks the conduit 74, as shown in FIG. 5 or to a position where it blocks the conduit 76.

The pivot pin 85 extends through the wall of the conduit 74 and has rigidly secured thereto a lever 86. Attached to the lever is one end of a spring member 88 which is connected, at its other ends, to the inside of the cylindrical housing wall and normally urges the lever in a counterclockwise direction so that the valve plate 84 closes the conduit 76 and allows air to flow from the outside conduit 74. A lost motion pivot connects the lever to a link member 90 that extends through the cylindrical housing wall and through the side of the vehicle where it is connected to the cable 48. The actuating mechanism is the same as that shown in FIG. 1 and, upon operation of the windshield wipers, will pull the cable and the link 90 and consequently the handle 86 so that the valve 84 closes the passage 74.

While in the foregoing there has been described a preferred embodiment of this invention, various modifications may become apparent to those skilled in the art to which this invention relates. Accordingly, it is not desired to limit the invention to this disclosure, but to the various modifications that lie within the scope of the appended claims.

I claim:

1. An air intake control mechanism for vehicles having windshield wiper mechanisms comprising:
    actuating means responsive to the windshield wiper mechanism;
    selector valve means and conduits for selectively conveying air from the exterior or interior of the engine compartment of the vehicle to the intake manifold of the engine; and
    control means operatively connecting the selector valve means and the actuating means, the control means automatically actuating the selector valve means when the windshield wiper mechanism is actuated.

2. An air intake control mechanism as defined in claim 1 wherein the actuating means comprises a finger member for driving the control means.

3. An air intake control mechanism as defined in claim 1 wherein the control means includes a rotatable member that is driven by the actuating means.

4. An air intake mechanism as defined in claim 3 wherein the rotatable member is biased to a first position wherein the selector valve means conveys air from the exterior of the engine compartment to the intake manifold.

5. An air intake mechanism as defined in claim 4 wherein a force transmitting means is connected to the rotatable member and to the selector valve means so that movement of the rotatable member to a second position actuates the selector valve means to allow the passage of air from the interior of the engine compartment to the intake manifold.

6. An air intake mechanism as defined in claim 5 wherein the control means includes a stop means for holding the rotatable member in the second position.

7. An air intake mechanism as defined in claim 6 wherein the stop means comprises a lever that engages a shoulder on the rotatable member.

8. An air intake mechanism as defined in claim 7 wherein the lever is actuated by a plunger displaceable in response to the windshield wiper mechanism, the plunger automatically drives the lever into engagement with the rotatable member when the windshield wiper mechanism is actuated.

9. An air intake control mechanism for a vehicle having a windshield wiper mechanism and an air cleaner communicating with the intake manifold of the engine comprising:
    selector valve means and conduits for selectively communicating the air cleaner with the exterior and the interior of the engine compartment,
    means for holding the selector valve means in a first position in which the air cleaner communicates with the exterior of the engine compartment, and
    control means responsive to the windshield wiper mechanism for automatically actuating the selector valve means to a second position in which the air cleaner communicates with the interior of the engine compartment when the windshield wiper mechanism is actuated.

10. An air intake control mechanism as defined in claim 9 including means responsive to the windshield wiper mechanism for automatically locking the selector valve means in the second position when the windshield wiper mechanism is actuated.